US011470617B2

(12) United States Patent
Liu

(10) Patent No.: US 11,470,617 B2
(45) Date of Patent: Oct. 11, 2022

(54) METHOD AND APPARATUS FOR INDICATING INFORMATION, BASE STATION, AND USER EQUIPMENT

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 101 days.

(21) Appl. No.: 16/870,919

(22) Filed: May 9, 2020

(65) Prior Publication Data
US 2020/0275451 A1   Aug. 27, 2020

Related U.S. Application Data

(63) Continuation of application No. PCT/CN2017/113201, filed on Nov. 27, 2017.

(51) Int. Cl.
*H04W 72/04* (2009.01)
*H04W 72/00* (2009.01)
(Continued)

(52) U.S. Cl.
CPC ....... *H04W 72/0493* (2013.01); *H04L 5/0094* (2013.01); *H04W 56/001* (2013.01); *H04W 72/005* (2013.01)

(58) Field of Classification Search
CPC . H04L 5/0092; H04L 27/2602; H04L 27/266; H04L 5/0053; H04L 27/2613;
(Continued)

(56) References Cited

U.S. PATENT DOCUMENTS

2017/0142771 A1   5/2017   Larsson et al.
2018/0337755 A1*  11/2018  John Wilson ....... H04L 27/2613
(Continued)

FOREIGN PATENT DOCUMENTS

| CN | 104303478 A | 1/2015 |
| CN | 107211238 A | 9/2017 |
| WO | 2017139540 A1 | 8/2017 |

OTHER PUBLICATIONS

3GPP TR 38.811V0.1.0 (Jun. 2017), 3rd Generation Partnership Project, Technical Specification Group Radio Access Network, Study on New Radio (NR) to support Non Terrestrial Networks (Release 15).
(Continued)

*Primary Examiner* — Yee F Lam
(74) *Attorney, Agent, or Firm* — Syncoda LLC; Feng Ma

(57) ABSTRACT

A method for indicating information includes: whether a configured SCS of an SSB is less than an SCS of a common CORESET for RMSI corresponding to the SSB and whether time-frequency multiplexing indication information, in a PBCH of the SSB, of the CORESET for the RMSI indicates TDM of the CORESET for the RMSI and the SSB are determined; responsive to that the SCS of an SSB is less than the SCS of the CORESET for the RMSI, and the time-frequency multiplexing indication information of the CORESET of the RMSI indicates TDM of the CORESET for the RMSI and the SSB, an offset value between the PRB grid of the CORESET for the RMSI and the PRB grid of the SSB is indicated through the time-frequency multiplexing indication information; and the SSB carrying the time-frequency multiplexing indication information is sent to UE in a beam scanning manner.

12 Claims, 17 Drawing Sheets

(51) Int. Cl.
*H04W 56/00* (2009.01)
*H04L 5/00* (2006.01)

(58) Field of Classification Search
CPC ... H04L 5/0048; H04L 5/0091; H04L 5/0044; H04W 56/0035; H04W 72/042; H04W 72/0453; H04W 24/02; H04W 72/1263; H04W 56/001
See application file for complete search history.

(56) References Cited

U.S. PATENT DOCUMENTS

| | | | |
|---|---|---|---|
| 2019/0028914 A1* | 1/2019 | Wu | H04W 36/08 |
| 2019/0028940 A1* | 1/2019 | Wu | H04W 36/0005 |
| 2019/0069322 A1* | 2/2019 | Davydov | H04W 74/006 |
| 2019/0082431 A1* | 3/2019 | Yl | H04L 5/0055 |
| 2019/0132170 A1* | 5/2019 | Si | H04L 27/266 |
| 2019/0140880 A1* | 5/2019 | Li | H04L 27/26025 |
| 2019/0150068 A1* | 5/2019 | Montojo | H04W 48/12 370/329 |
| 2019/0150121 A1* | 5/2019 | Abdoli | H04L 5/0092 370/329 |
| 2019/0159226 A1* | 5/2019 | Ly | H04L 5/0053 |
| 2019/0166611 A1* | 5/2019 | Noh | H03M 13/2906 |
| 2020/0244530 A1* | 7/2020 | Lin | H04W 56/001 |
| 2020/0296656 A1* | 9/2020 | Amuru | H04W 48/12 |
| 2021/0007086 A1* | 1/2021 | Liu | H04L 5/0094 |
| 2021/0185683 A1* | 6/2021 | Reial | H04W 72/042 |

OTHER PUBLICATIONS

CMCC. "Details on PRB Grid Offset Indication" 3GPP TSG RAN WG1 Meeting 91 R1-1720581, Nov. 18, 2017 (Nov. 18, 2017), entire document.
TSG RAN WG1. "Status Report to TSG: New Radio (NR) Access Technology" 3GPP TSG RAN meeting #77 RP-171783, Sep. 6, 2017 (Sep. 6, 2017), entire document.
TSG RAN WG1. "Status Report to TSG: New Radio (NR) Access Technology" 3GPP TSG RAN meeting #76 RP-1711505, Jun. 8, 2017 (Jun. 8, 2017), entire document.
International Search Report in the international application No. PCT/CN2017/113201, dated Aug. 15, 2018.
English translation of the Written Opinion of the International Search Authority in the international application No. PCT/CN2017/113201, dated Aug. 15, 2018.
Nokia, Nokia Shanghai Bell, "Remaining details on NR-PBCH", 3GPP TSG-RAN WG1 NR AH#3 R1-1716524 Nagoya, Japan, Sep. 18-21, 2017.
Qualcomm Incorporated, "Remaining system information delivery consideration", 3GPP TSG RAN WG1 Meeting 91 R1-1720649 Reno, Nov. 27-Dec. 1, 2017.

* cited by examiner

METHOD AND APPARATUS FOR INDICATING INFORMATION, BASE STATION, AND USER EQUIPMENT

CROSS-REFERENCE TO RELATED APPLICATION

The present application is a continuation of International Application No. PCT/CN2017/113201 filed on Nov. 27, 2017, the disclosure of which is hereby incorporated by reference in its entirety.

BACKGROUND

In recent discussions of the 3rd Generation Partnership Project (3GPP), it is proposed that how to indicate information of a Common Control Resource Set (CORESET) for RMSI in a Physical Broadcast Channel (PBCH) is an important problem that needs to be solved. The information of the CORESET for the RMSI includes information of a frequency domain, a time domain, a Physical Downlink Control Channel (PDCCH) search window, a cycle and the like. At present, a length for indication information of a CORESET for RMSI in a PBCH is about 8 bits, and 1 bit is configured to represent two probable Subcarrier Spacings (SCSs) of the RMSI.

SUMMARY

The present disclosure generally relates to the technical field of communication, and more specifically to a method and device for information indication, a method and device for searching a common Core Resource Set (CORESET) for Remaining Minimum System Information (RMSI), a base station, User Equipment (UE) and a computer-readable storage medium.

According to a first aspect of embodiments of the present disclosure, there is provided a method for information indication, which may be applied to a base station and include that:

whether a configured SCS of an SSB is less than an SCS of a common CORESET for RMSI corresponding to the SSB and whether time-frequency multiplexing indication information, in a PBCH of the SSB, of the CORESET for the RMSI indicates Time Division Multiplexing (TDM) of the CORESET for the RMSI and the SSB are determined;

responsive to that the SCS of the SSB is less than the SCS of the CORESET for the RMSI and the time-frequency multiplexing indication information indicates TDM of the CORESET for the RMSI and the SSB, an offset value between the PRB grid of the CORESET for the RMSI and the PRB grid of the SSB is indicated through the time-frequency multiplexing indication information; and the SSB carrying the time-frequency multiplexing indication information is sent to UE in a beam scanning manner.

According to a second aspect of the embodiments of the present disclosure, there is provided a method for searching a common CORESET for RMSI, which may be applied to UE and include that:

an SSB carrying time-frequency multiplexing indication information of the CORESET for RMSI is received from a base station, the time-frequency multiplexing indication information being in a PBCH of the SSB;

an SCS of the SSB is determined, and the PBCH of the SSB is parsed to obtain an SCS and the time-frequency multiplexing indication information of the CORESET for the RMSI; and responsive to that the SCS of the SSB is less than the SCS of the CORESET for the RMSI and the time-frequency multiplexing indication information indicates TDM of the CORESET for the RMSI and the SSB, an offset value between the PRB grid of the CORESET for the RMSI and the PRB grid of the SSB is acquired from the time-frequency multiplexing indication information, and the CORESET for the RMSI is searched in a corresponding frequency domain according to the offset value between the PRB grid of the CORESET for the RMSI and the PRB grid of the SSB.

According to a third aspect of the embodiments of the present disclosure, there is provided a device for searching a common CORESET for RMSI, which may be applied to UE and include:

a processor and a memory configured to store processor-executable instructions, herein the processor is configured to:

receive an SSB carrying time-frequency multiplexing indication information of a CORESET for RMSI from a base station, the time-frequency multiplexing indication information being in a PBCH of the SSB;

determine an SCS of the SSB and parse the PBCH of the SSB to obtain an SCS and the time-frequency multiplexing indication information of the CORESET for the RMSI; and responsive to that the SCS of the SSB is less than the SCS of the CORESET for the RMSI and the time-frequency multiplexing indication information indicates the TDM of the CORESET for the RMSI and the SSB, acquire a offset value between the PRB grid of the CORESET for the RMSI and the PRB grid of the SSB from the time-frequency multiplexing indication information and search the CORESET for the RMSI in a corresponding frequency domain according to the offset value between the PRB grid of the CORESET for the RMSI and the PRB grid of the SSB.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
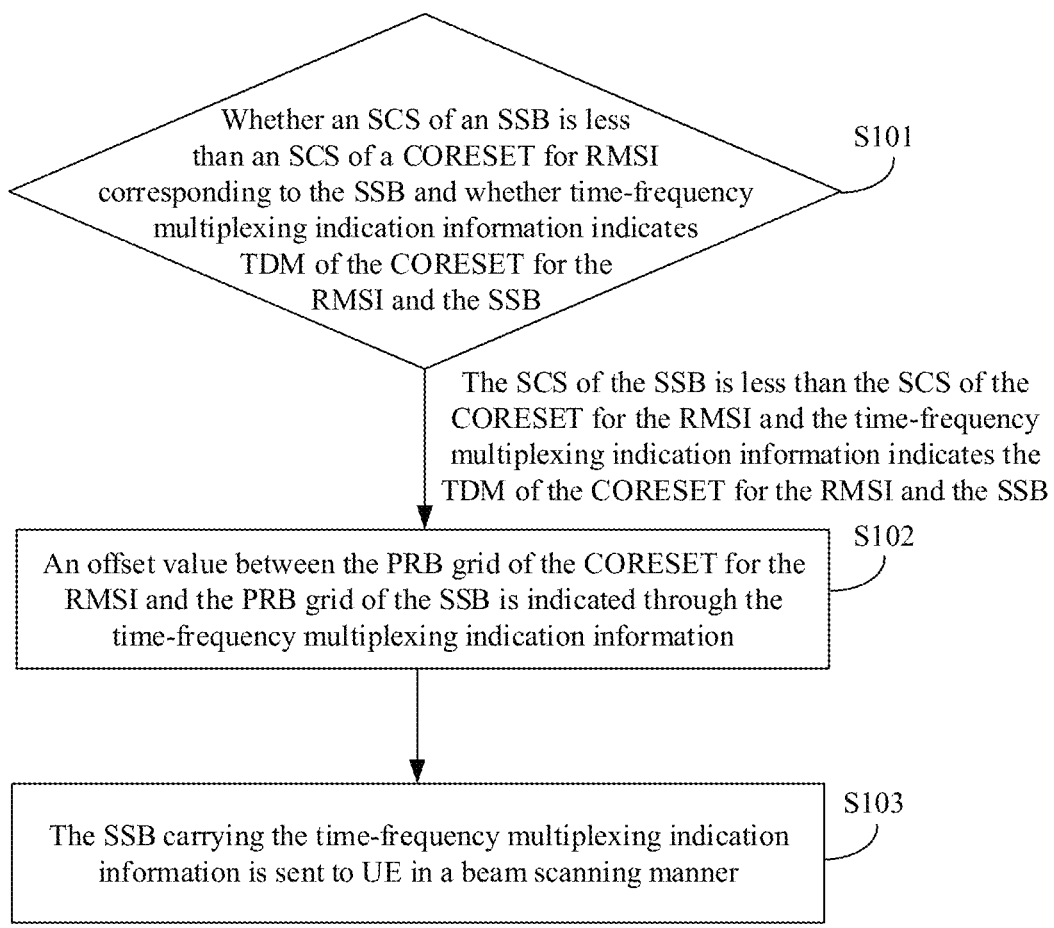
FIG. 1 is a flowchart showing a method for information indication, according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

Physical Resource Block (PRB) grids of a CORESET for RMSI are distributed with reference to PRB grids of a Synchronization Signal Block (SSB). However, when an SCS of the CORESET for the RMSI is greater than an SCS of the SSB, there are two conditions for an offset of the PRB grids thereof, and representation with 1 bit in a PBCH is wasteful for indication information with a length of totally about 8 bits.

Various embodiments of the present disclosure provide a method and device for information indication, a method and device for searching a CORESET for RMSI, a base station, UE and a computer-readable storage medium, to indicate an offset between a PRB grid of a CORESET for RMSI and a PRB grid of an SSB by use of time-frequency multiplexing indication information of the CORESET for the RMSI, thereby achieving the purpose of reducing a bit overhead.

FIG. 1 is a flowchart showing a method for information indication, according to some embodiments of the present disclosure. The embodiment is described from a base station side. As shown in FIG. 1, the method for information indication includes the following blocks.

In S101, whether a configured SCS of an SSB is less than an SCS of a CORESET for RMSI corresponding to the SSB and whether time-frequency multiplexing indication information, in a PBCH of the SSB, of the CORESET for the RMSI indicates TDM of the CORESET for the RMSI and the SSB are determined.

The time-frequency multiplexing indication information of the CORESET for the RMSI is in the PBCH of the corresponding SSB, and the time-frequency multiplexing indication information is used to indicate TDM or FDM of the CORESET for the RMSI and the SSB.

It is to be noted that, in the embodiments, there is no multiple-to-one relationship between the CORESET for the RMSI and the SSB, namely the condition that no CORESET for RMSI is after an SSB does not exist. Based on this, the time-frequency multiplexing indication information of the CORESET for the RMSI may be shown in Table 1.

TABLE 1

Index and Meaning of Time-Frequency Multiplexing Indication Information of CORESET for RMSI

| Index | Meaning |
| --- | --- |
| 0 (00) | FDM is implemented for the CORESET for the RMSI and the SSB, and the frequency band where the CORESET for the RMSI is located is higher than the band where the SSB is located |
| 1 (01) | FDM is implemented for the CORESET for the RMSI and the SSB, and the frequency band where the CORESET for the RMSI is located is lower than the band where the SSB is located |
| 2 (10) | First condition of TDM of the CORESET for the RMSI and the SSB |
| 3 (11) | Second condition of TDM of the CORESET for the RMSI and the SSB |

In S102, responsive to that the SCS of the SSB is less than the SCS of the CORESET for the RMSI and the time-frequency multiplexing indication information indicates TDM of the CORESET for the RMSI and the SSB, an offset value between the PRB grid of the CORESET for the RMSI and the PRB grid of the SSB is indicated through the time-frequency multiplexing indication information.

The time-frequency multiplexing indication information includes first time-frequency multiplexing indication information and second time-frequency multiplexing indication information, and both the first time-frequency multiplexing indication information and the second time-frequency multiplexing indication information indicate TDM of the CORESET for the RMSI and the SSB. In the embodiments, the first time-frequency multiplexing indication information may be one condition of TDM, i.e., one condition corresponding to index 2 or 3 in Table 1, and the second time-frequency multiplexing indication information may be another condition of TDM, i.e., the other condition corresponding to index 2 or 3 in Table 1.

Figure 2A:
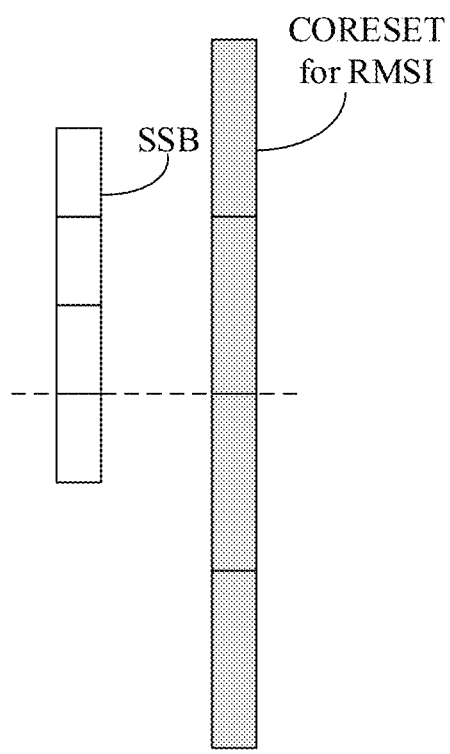
FIG. 2A is a first schematic diagram illustrating TDM of a CORESET for RMSI and an SSB, according to some embodiments of the present disclosure.
Figure 2B:
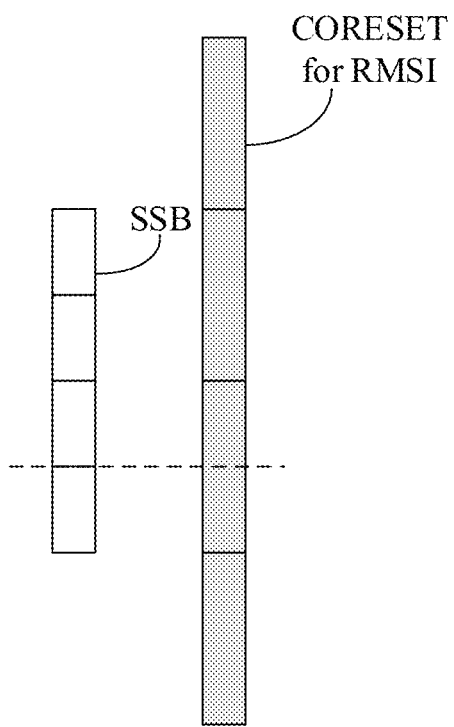
FIG. 2B is a second schematic diagram illustrating TDM of a CORESET for RMSI and an SSB, according to some embodiments of the present disclosure.

In these embodiments, when a offset position of frequency-domain (for example, 1 PRB) of the CORESET for the RMSI is indicated in the SSB, responsive to that the SCS of the SSB is less than the SCS of the CORESET for the RMSI and the time-frequency multiplexing indication information indicates TDM of the CORESET for the RMSI and the SSB, UE calculates an offset value of the two according to a PRB of the CORESET for the RMSI. In such case, a granularity of 1 PRB offset, calculated by the UE, of the CORESET for the RMSI is relatively great, and an offset may be an offset of PRBs of the two SSBs, so that two conditions are required to be indicated. The two conditions are shown in FIG. 2A and FIG. 2B.

In these embodiments, the offset value between the PRB grid of the CORESET for the RMSI and the PRB grid of the SSB may be indicated through the first time-frequency multiplexing indication information or the second time-frequency multiplexing indication information. The condition shown in FIG. 2A may be indicated through the time-frequency multiplexing indication information represented with index 2 or 10 in Table 1, and the condition shown in FIG. 2B may be indicated through the time-frequency multiplexing indication information represented with index 3 or 11 in Table 1. Of course, the condition shown in FIG. 2A may also be indicated through the time-frequency multiplexing indication information represented with index 3 or 11 in Table 1, and the condition shown in FIG. 2B may also be indicated through the time-frequency multiplexing indication information represented with index 2 or 10 in Table 1.

In S103, the SSB carrying the time-frequency multiplexing indication information is sent to UE in a beam scanning manner.

According to these embodiments, the offset value between the PRB grid of the CORESET for the RMSI and the PRB grid of the SSB is indicated through the time-frequency multiplexing indication information, namely the offset value between the PRB grid of the CORESET for the RMSI and the PRB grid of the SSB is indicated by use of the time-frequency multiplexing indication information, so that the purpose of reducing bits overhead is achieved.

Figure 3:
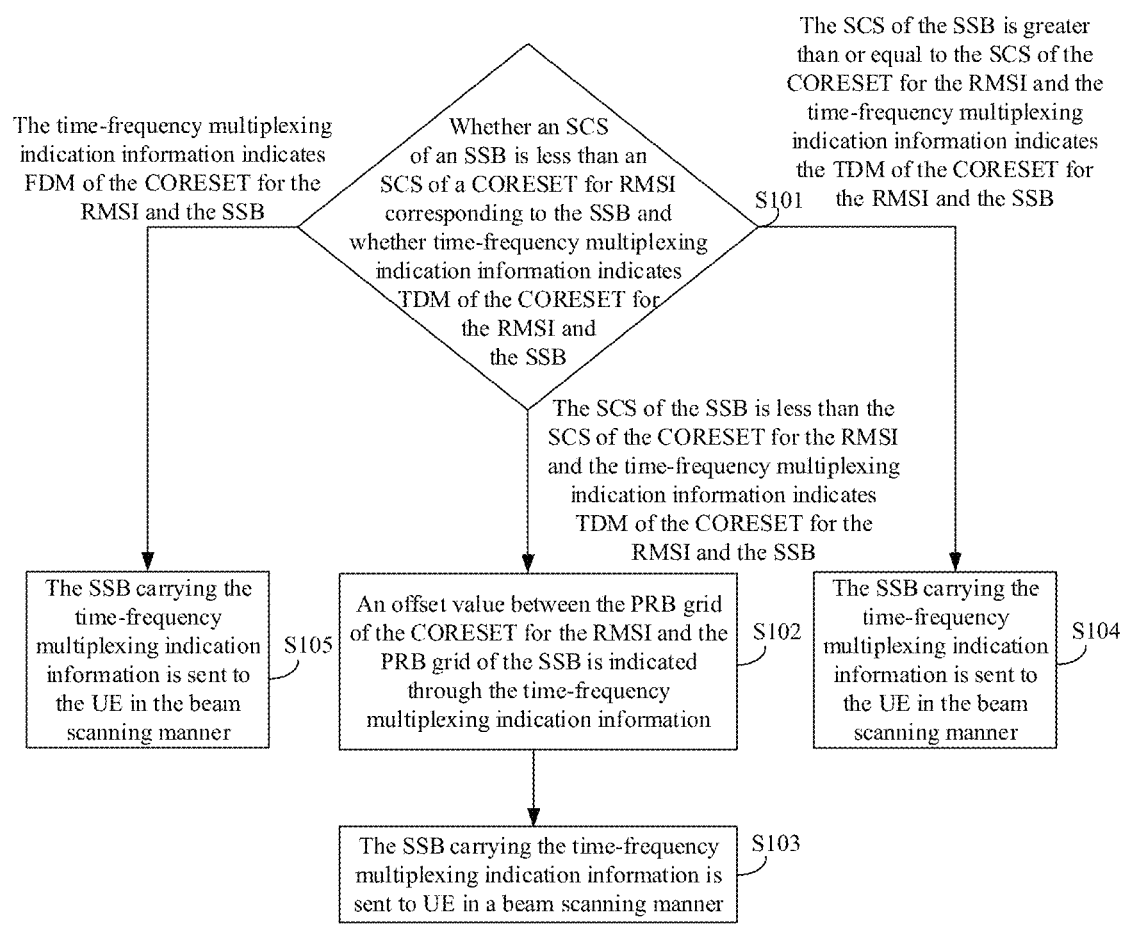
FIG. 3 is a flowchart showing another method for information indication, according to some embodiments of the present disclosure.

FIG. 3 is a flowchart showing another method for information indication, according to some embodiments of the present disclosure. As shown in FIG. 3, after S101, the method may further include S104 or S105.

In S104, responsive to that the SCS of the SSB is greater than or equal to the SCS of the CORESET for the RMSI and the time-frequency multiplexing indication information indicates TDM of the CORESET for the RMSI and the SSB, the SSB carrying the time-frequency multiplexing indication information is sent to the UE in the beam scanning manner.

In these embodiments, responsive to that the SCS of the SSB is greater than or equal to the SCS of the CORESET for the RMSI, the offset value between the PRB grid of the CORESET for the RMSI and the PRB grid of the SSB is not required to be indicated through the time-frequency multiplexing indication information.

In S105, responsive to that the time-frequency multiplexing indication information indicates FDM of the CORESET for the RMSI and the SSB, the SSB carrying the time-frequency multiplexing indication information is sent to the UE in the beam scanning manner.

In these embodiments, responsive to that the time-frequency multiplexing indication information indicates FDM of the CORESET for the RMSI and the SSB, PRB of the CORESET for the RMSI and PRB of the SSB are adjacent. For the UE, it is unnecessary to know the offset value between the PRB grid of the CORESET for the RMSI and the PRB grid of the SSB, so that the offset value between the PRB grid of the CORESET for the RMSI and the PRB grid of the SSB is not required to be indicated through the time-frequency multiplexing indication information.

According to these embodiments, under all other conditions except the condition that the SCS of the SSB is less than the SCS of the CORESET for the RMSI and the time-frequency multiplexing indication information indicates TDM of the CORESET for the RMSI and the SSB, the SSB carrying the time-frequency multiplexing indication information is directly sent to the UE in the beam scanning manner such that a base station may also searches the CORESET for the RMSI without knowing the offset value between the PRB grid of the CORESET for the RMSI and the PRB grid of the SSB.

Figure 4:
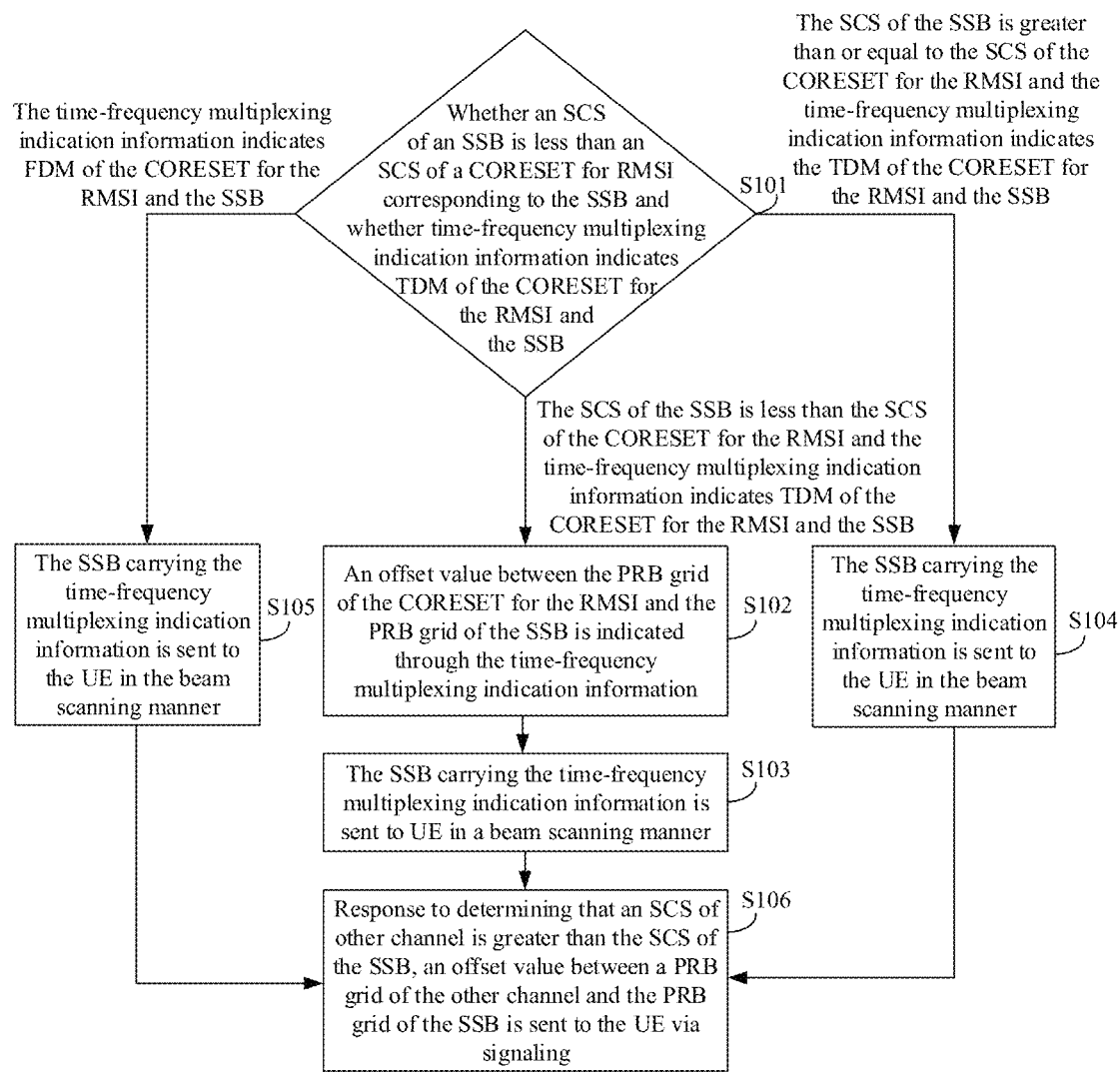
FIG. 4 is a flowchart showing another method for information indication, according to some embodiments of the present disclosure.

FIG. 4 is a flowchart showing another method for information indication, according to some embodiments of the present disclosure. As shown in FIG. 4, after S103, S104 or S105, the method may further include the following step.

In S106, responsive to determining that an SCS of other channel is greater than the SCS of the SSB, an offset value between a PRB grid of the other channel and the PRB grid of the SSB is sent to the UE via signaling.

In these embodiments, under the condition that the SCS of the other channel is greater than the SCS of the SSB, the base station may further send the offset value between the PRB grid of the other channel and the PRB grid of the SSB to the UE via the signaling, for example, sending an offset value between a PRB grid of a Physical Random Access Channel (PRACH) and the PRB grid of the SSB.

According to these embodiments, under the condition that the SCS of the other channel is greater than the SCS of the SSB, the offset value between the PRB grid of the other channel and the PRB grid of the SSB is sent to the UE via the signaling such that the UE, after searching the CORESET for the RMSI, may acquire information of the other channel.

Figure 5:
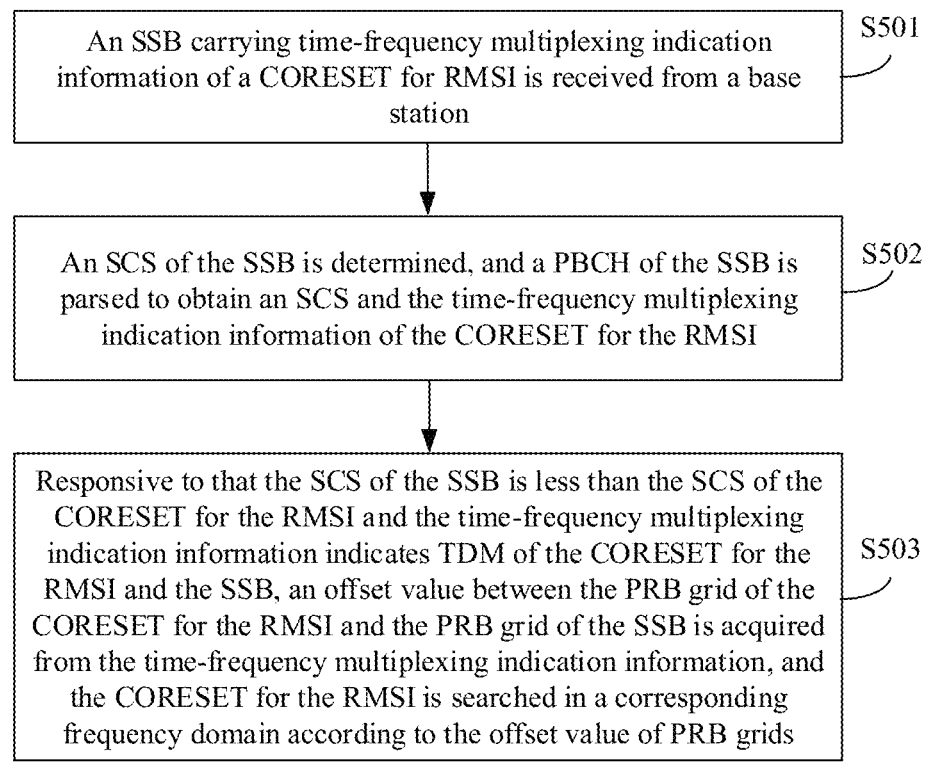
FIG. 5 is a flowchart showing a method for searching a CORESET for RMSI, according to some embodiments of the present disclosure.

FIG. 5 is a flowchart showing a method for searching a CORESET for RMSI, according to some embodiments of the present disclosure. The embodiment is described from a UE side. As shown in FIG. 5, the method includes the following blocks.

In S501, an SSB carrying time-frequency multiplexing indication information of a CORESET for the RMSI is received from a base station, the time-frequency multiplexing indication information being in a PBCH of the SSB.

In S502, an SCS of the SSB is determined, and the PBCH of the SSB is parsed to obtain an SCS and time-frequency multiplexing indication information of the CORESET for the RMSI.

UE may try to parse a synchronization signal by using two predetermined SCSs of a frequency band where the SSB is located, and determine the SCS through which the synchronization signal is correctly parsed as the SCS of the SSB, and then may parse the PBCH of the SSB to obtain the SCS and time-frequency multiplexing indication information of the CORESET for the RMSI.

In S503, responsive to that the SCS of the SSB is less than the SCS of the CORESET for the RMSI and the time-frequency multiplexing indication information indicates TDM of the CORESET for the RMSI and the SSB, an offset value between the PRB grid of the CORESET for the RMSI and the PRB grid of the SSB is acquired from the time-frequency multiplexing indication information, and the CORESET for the RMSI is searched in a corresponding frequency domain according to the offset value between the PRB grid of the CORESET for the RMSI and the PRB grid of the SSB.

Responsive to that the SCS of the SSB is less than the SCS of the CORESET for the RMSI and when the time-frequency multiplexing indication information indicates TDM of the CORESET for the RMSI and the SSB, the UE may know that the time-frequency multiplexing indication information may indicate the offset value between the PRB grid of the CORESET for the RMSI and the PRB grid of the SSB, and thus acquires the offset value between the PRB grid of the CORESET for the RMSI and the PRB grid of the SSB from the time-frequency multiplexing indication information and searches the CORESET for the RMSI in a corresponding frequency domain according to the offset value between the PRB grid of the CORESET for the RMSI and the PRB grid of the SSB.

According to these embodiments, when it is determined that the SCS of the SSB is less than the SCS of the CORESET for the RMSI and the time-frequency multiplexing indication information indicates TDM of the CORESET for the RMSI and the SSB, the offset value between the PRB grid of the CORESET for the RMSI and the PRB grid of the SSB is acquired from the time-frequency multiplexing indication information, and the CORESET for the RMSI is searched in the corresponding frequency domain according to the offset value between the PRB grid of the CORESET for the RMSI and the PRB grid of the SSB, namely the UE may search the CORESET for the RMSI without any additional bits overhead.

Figure 6:
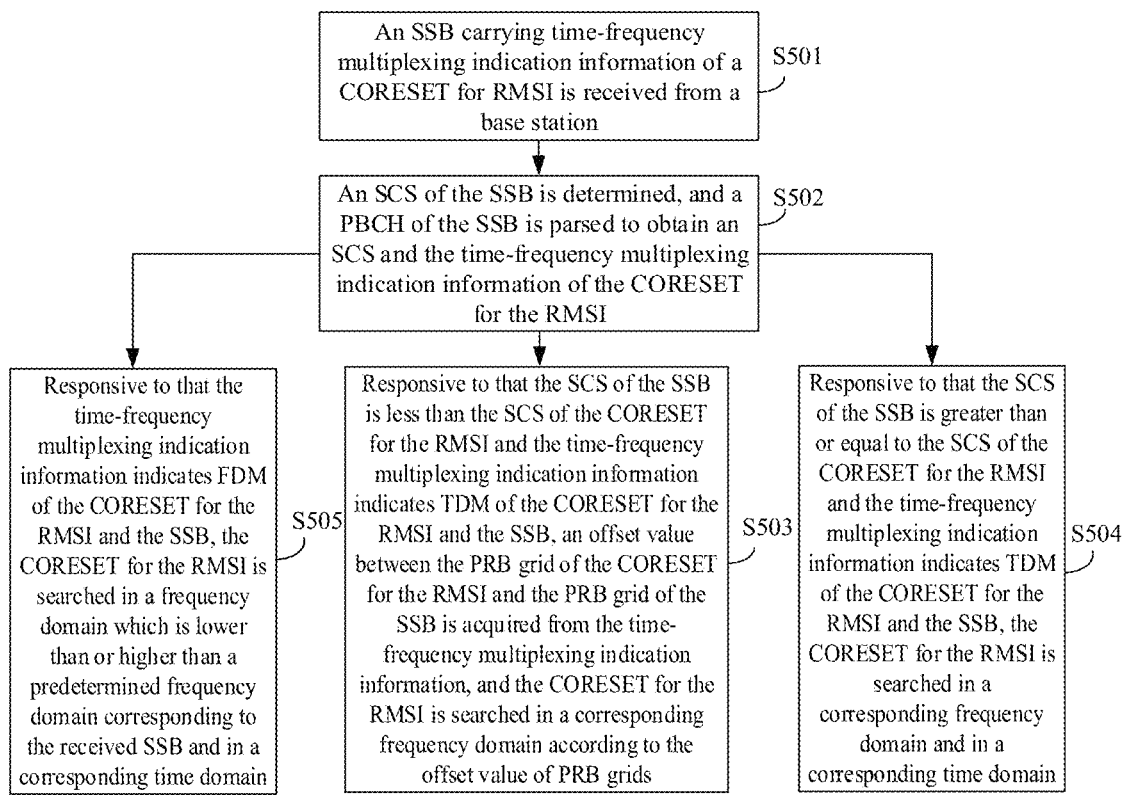
FIG. 6 is a flowchart showing another method for searching a CORESET for RMSI, according to some embodiments of the present disclosure.

FIG. 6 is a flowchart showing another method for searching a CORESET for RMSI, according to some embodiments of the present disclosure. As shown in FIG. 6, after S502, the method may further include S504 or S505.

In S504, responsive to that the SCS of the SSB is greater than or equal to the SCS of the CORESET for the RMSI and the time-frequency multiplexing indication information indicates TDM of the CORESET for the RMSI and the SSB, the CORESET for the RMSI is searched in a corresponding frequency domain and in a corresponding time domain.

Responsive to that the UE determines that the SCS of the SSB is greater than or equal to the SCS of the CORESET for the RMSI and the time-frequency multiplexing indication information indicates TDM of the CORESET for the RMSI and the SSB, the UE searches the CORESET for the RMSI in the corresponding frequency domain and in the corresponding time domain according to a TDM manner.

In S505, responsive to that the time-frequency multiplexing indication information indicates FDM of the CORESET for the RMSI and the SSB, the CORESET for the RMSI is searched in a frequency domain which is lower than or higher than a predetermined frequency domain corresponding to the received SSB and in a corresponding time domain.

The UE, if knowing that the time-frequency multiplexing indication information indicates FDM of the CORESET for the RMSI and the SSB, may search the CORESET for the RMSI in a frequency domain adjacent to a frequency domain where the SSB is located and in a corresponding time domain, namely searching the CORESET for the RMSI in the frequency domain which is lower than or higher than the predetermined frequency domain corresponding to the received SSB and in a corresponding time domain.

According to these embodiments, the CORESET for the RMSI is searched according to obtained information, and an implementation manner is simple.

Figure 7:
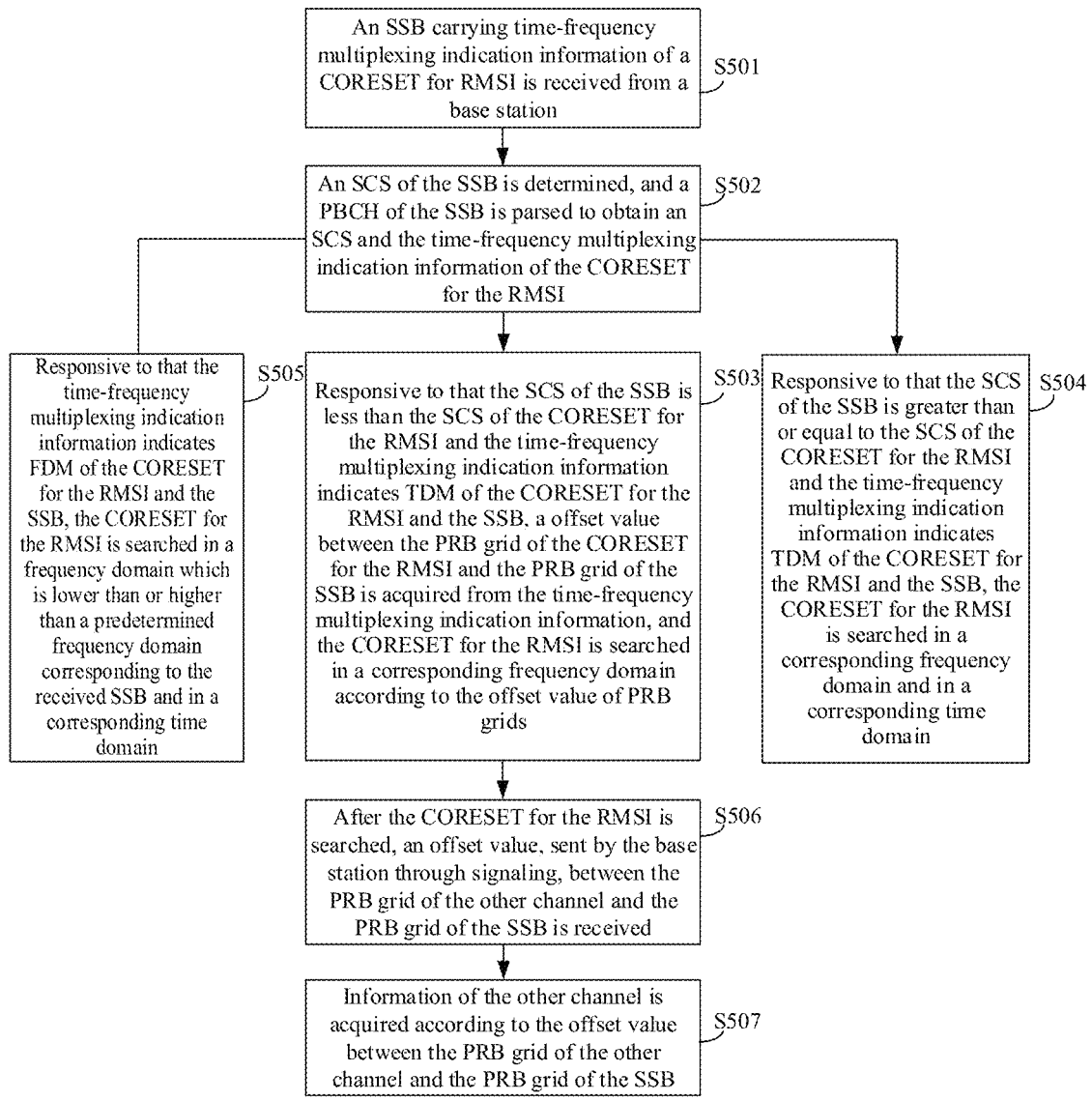
FIG. 7 is a flowchart showing another method for searching a CORESET for RMSI, according to some embodiments of the present disclosure.

FIG. 7 is a flowchart showing another method for searching a CORESET for RMSI, according to some embodiments of the present disclosure. As shown in FIG. 7, after S503, S504 or S505, the method may further include the following blocks.

In S506, after the CORESET for the RMSI is searched, an offset value, sent by the base station through signaling, between a PRB grid of other channel and the PRB grid of the SSB is received.

In S507, information of the other channel is acquired according to the offset value between the PRB grid of the other channel and the PRB grid of the SSB.

According to these embodiments, after the CORESET for the RMSI is searched, the information of the other channel may be acquired according to the received offset value between the PRB grid of another channel and the PRB grid of the SSB, and an implementation manner is simple.

Figure 8:
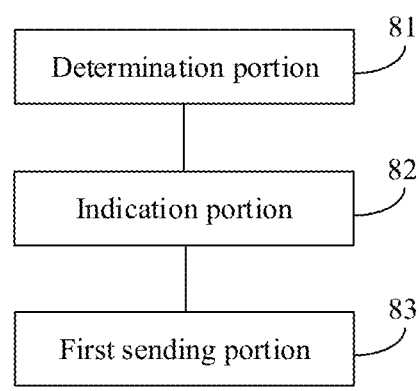
FIG. 8 is a block diagram of a device for information indication, according to some embodiments.

FIG. 8 is a block diagram of a device for information indication, according to some embodiments of the present disclosure. The device may be in a base station. As shown in FIG. 8, the device includes a determination portion 81, an indication portion 82 and a first sending portion 83.

The determination portion 81 is configured to determine whether a configured SCS of an SSB is less than an SCS of a common CORESET for RMSI corresponding to the SSB and whether time-frequency multiplexing indication information, in a PBCH of the SSB, of the CORESET for the RMSI indicates TDM of the CORESET for the RMSI and the SSB.

The time-frequency multiplexing indication information of the CORESET for the RMSI is in the PBCH of the corresponding SSB, and the time-frequency multiplexing indication information is configured to indicate TDM or FDM of the CORESET for the RMSI and the SSB.

It is to be noted that, in these embodiments, there is no multiple-to-one relationship between the CORESET for the RMSI and the SSB, namely the condition that no CORESET for RMSI is after an SSB does not exist. Based on this, the time-frequency multiplexing indication information of the CORESET for the RMSI may be shown in Table 1.

The indication portion 82 is configured to, responsive to that the determination portion 81 determines that the SCS of the SSB is less than the SCS of the CORESET for the RMSI and the time-frequency multiplexing indication information indicates TDM of the CORESET for the RMSI and the SSB, indicate an offset value between the PRB grid of the CORESET for the RMSI and the PRB grid of the SSB through the time-frequency multiplexing indication information.

The time-frequency multiplexing indication information includes first time-frequency multiplexing indication information and second time-frequency multiplexing indication information, and both the first time-frequency multiplexing indication information and the second time-frequency multiplexing indication information indicate TDM of the CORESET for the RMSI and the SSB. In these embodiments, the first time-frequency multiplexing indication information may be one condition of TDM, i.e., one condition corresponding to index 2 or 3 in Table 1, and the second time-frequency multiplexing indication information may be another condition of TDM, i.e., the other condition corresponding to index 2 or 3 in Table 1.

In these embodiments, when an offset position of frequency-domain (for example, 1 PRB) of the CORESET for the RMSI is indicated in the SSB, responsive to that the SCS of the SSB is less than the SCS of the CORESET for the RMSI and the time-frequency multiplexing indication information indicates TDM of the CORESET for the RMSI and the SSB, UE calculates an offset value of the two according to a PRB of the CORESET for the RMSI. In such case, a granularity of 1 PRB offset, calculated by the UE, of the CORESET for the RMSI is relatively great, and an offset may be an offset of PRBs of two SSBs, so that two conditions are required to be indicated. The two conditions are shown in FIG. 2A and FIG. 2B.

In these embodiments, the offset value between the PRB grid of the CORESET for the RMSI and the PRB grid of the SSB may be indicated through the first time-frequency multiplexing indication information or the second time-frequency multiplexing indication information. The condition shown in FIG. 2A may be indicated through the time-frequency multiplexing indication information represented with index 2 or 10 in Table 1, and the condition shown in FIG. 2B may be indicated through the time-frequency multiplexing indication information represented with index 3 or 11 in Table 1. Of course, the condition shown in FIG. 2A may also be indicated through the time-frequency multiplexing indication information represented with index 3 or 11 in Table 1, and the condition shown in FIG. 2B may also be indicated through the time-frequency multiplexing indication information represented with index 2 or 10 in Table 1.

The first sending portion 83 is configured to send the SSB carrying the time-frequency multiplexing indication information configured for the indication portion 82 to indicate the offset value between the PRB grid of the CORESET for the RMSI and the PRB grid of the SSB to UE in a beam scanning manner.

According to these embodiments, the offset value between the PRB grid of the CORESET for the RMSI and the PRB grid of the SSB is indicated through the time-frequency multiplexing indication information, namely the offset value between the PRB grid of the CORESET for the RMSI and the PRB grid of the SSB is indicated by use of the time-frequency multiplexing indication information, so that the purpose of reducing bits overhead is achieved.

Figure 9A:
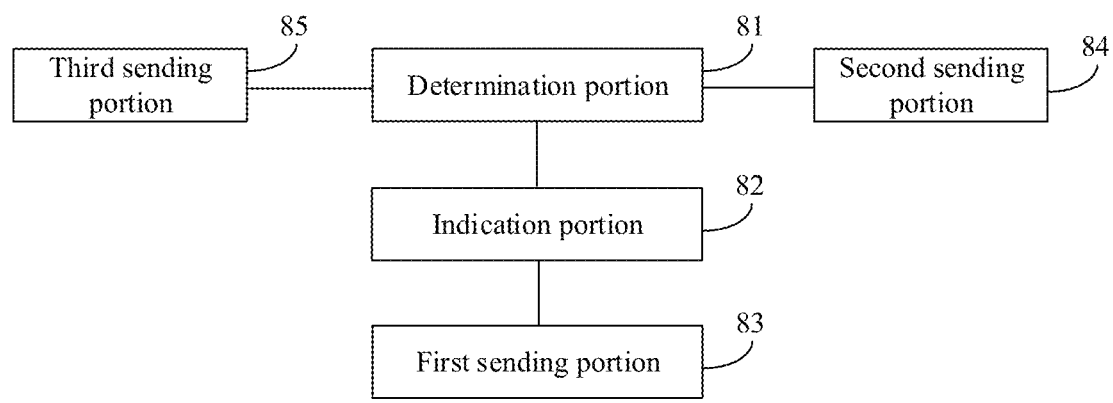
FIG. 9A is a block diagram of another device for information indication, according to some embodiments of the present disclosure.

FIG. 9A is a block diagram of another device for information indication, according to some embodiments of the present disclosure. As shown in FIG. 9A, based on the embodiment shown in FIG. 8, the device may further include a second sending portion 84 or a third sending portion 85.

The second sending portion 84 is configured to, responsive to that the determination portion 81 determines that the SCS of the SSB is greater than or equal to the SCS of the CORESET for the RMSI and the time-frequency multiplexing indication information indicates TDM of the CORESET for the RMSI and the SSB, send the SSB carrying the time-frequency multiplexing indication information to the UE in the beam scanning manner.

In these embodiments, responsive to that the SCS of the SSB is greater than or equal to the SCS of the CORESET for the RMSI, the offset value between the PRB grid of the CORESET for the RMSI and the PRB grid of the SSB is not required to be indicated through the time-frequency multiplexing indication information.

The third sending portion 85 is configured to, responsive to that the determination portion 81 determines that the time-frequency multiplexing indication information indicates FDM of the CORESET for the RMSI and the SSB, send the SSB carrying the time-frequency multiplexing indication information to the UE in the beam scanning manner.

In these embodiments, responsive to that the time-frequency multiplexing indication information indicates FDM of the CORESET for the RMSI and the SSB, PRBs of the CORESET for the RMSI and PRB of the SSB are adjacent. For the UE, it is unnecessary to know the offset value between the PRB grid of the CORESET for the RMSI and the PRB grid of the SSB between the PRB grid of the CORESET for the RMSI and the PRB grid of the SSB, so that the offset value between the PRB grid of the CORESET for the RMSI and the PRB grid of the SSB is not required to be indicated through the time-frequency multiplexing indication information.

According to these embodiments, under all other conditions except the condition that the SCS of the SSB is less than the SCS of the CORESET for the RMSI and the time-frequency multiplexing indication information indicates TDM of the CORESET for the RMSI and the SSB, the SSB carrying the time-frequency multiplexing indication information is directly sent to the UE in the beam scanning manner such that the base station may also searches the CORESET for the RMSI without knowing the offset value between the PRB grid of the CORESET for the RMSI and the PRB grid of the SSB.

Figure 9B:
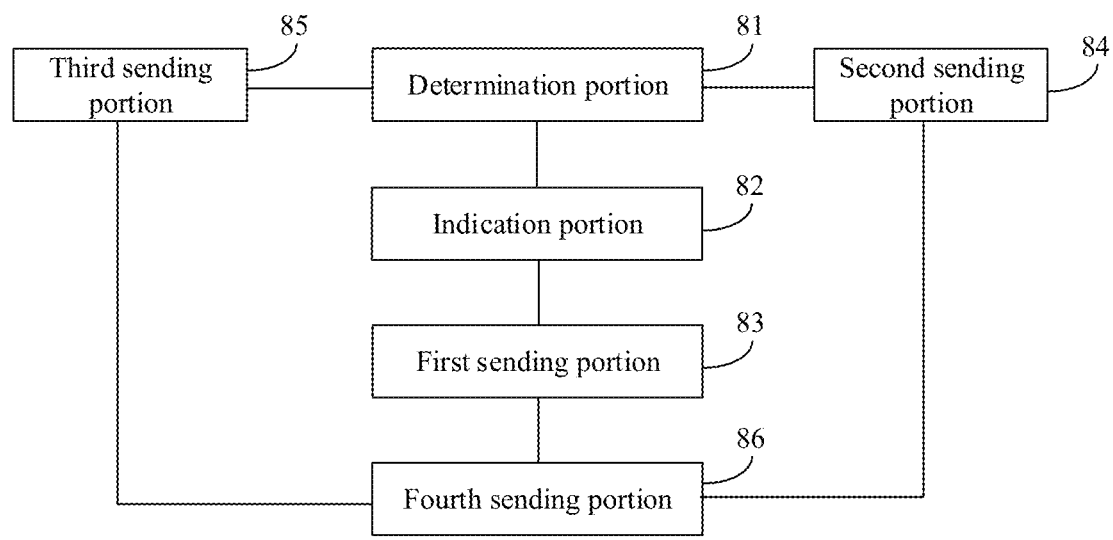
FIG. 9B is a block diagram of another device for information indication, according to some embodiments of the present disclosure.

FIG. 9B is a block diagram of another device for information indication, according to some embodiments of the present disclosure. As shown in FIG. 9B, based on the embodiment shown in FIG. 8 or FIG. 9A, the device may further include a fourth sending portion 86.

The fourth sending portion 86 is configured to, after the first sending portion 83, the second sending portion 84 or the third sending portion 85 sends the SSB carrying the time-frequency multiplexing indication information to the UE in the beam scanning manner, responsive to determining that an SCS of other channel is greater than the SCS of the SSB, send an offset value between a PRB grid of the other channel and the PRB grid of the SSB to the UE through signaling.

In these embodiments, under the condition that the SCS of the other channel is greater than the SCS of the SSB, the base station may further send offset value between the PRB grid of the other channel and the PRB grid of the SSB to the UE via the signaling, for example, sending an offset value between a PRB grid of a PRACH and the PRB grid of the SSB.

According to these embodiments, under the condition that the SCS of the other channel is greater than the SCS of the SSB, the offset value between the PRB grid of the other channel and the PRB grid of the SSB is sent to the UE via the signaling such that the UE, after searching the CORESET for the RMSI, may acquire information of the other channel.

Figure 10:
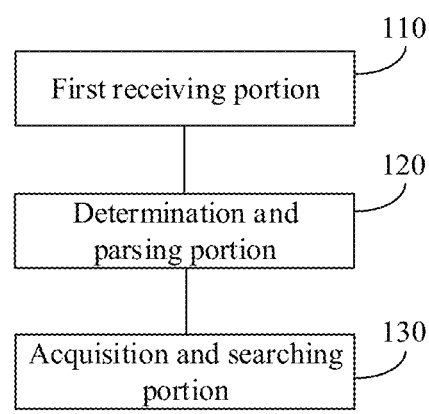
FIG. 10 is a block diagram of a device for searching a CORESET for RMSI, according to some embodiments of the present disclosure.

FIG. 10 is a block diagram of a device for searching a CORESET for RMSI, according to some embodiments of the present disclosure. The device may be in UE. As shown in FIG. 10, the device includes a first receiving portion 110, a determination and parsing portion 120 and an acquisition and searching portion 130.

The first receiving portion 110 is configured to receive an SSB carrying time-frequency multiplexing indication information of a CORESET for RMSI from a base station, the time-frequency multiplexing indication information being in a PBCH of the SSB.

The determination and parsing portion 120 is configured to determine an SCS of the SSB received by the first receiving portion 110 and parse the PBCH of the SSB to obtain an SCS and time-frequency multiplexing indication information of the CORESET for the RMSI.

The UE may try to parse a synchronization signal by using two predetermined SCSs of a frequency band where the SSB is located and determine the SCS through which the synchronization signal is correctly parsed as the SCS of the SSB, and then may parse the PBCH of the SSB to obtain the SCS and time-frequency multiplexing indication information of the CORESET for the RMSI.

The acquisition and searching portion 130 is configured to, responsive to that the SCS, determined by the determination and parsing portion 120, of the SSB is less than the SCS of the CORESET for the RMSI and the time-frequency multiplexing indication information indicates TDM of the CORESET for the RMSI and the SSB, acquire an offset value between the PRB grid of the CORESET for the RMSI and the PRB grid of the SSB from the time-frequency multiplexing indication information and search the CORESET for the RMSI in a corresponding frequency domain according to the offset value between the PRB grid of the CORESET for the RMSI and the PRB grid of the SSB.

Responsive to that the SCS of the SSB is less than the SCS of the CORESET for the RMSI and when the time-frequency multiplexing indication information indicates TDM of the CORESET for the RMSI and the SSB, the UE may know that the time-frequency multiplexing indication information may indicate the offset value between the PRB grid of the CORESET for the RMSI and the PRB grid of the SSB, and thus acquires the offset value between the PRB grid of the CORESET for the RMSI and the PRB grid of the SSB from the time-frequency multiplexing indication information and searches the CORESET for the RMSI in a corresponding frequency domain according to the offset value between the PRB grid of the CORESET for the RMSI and the PRB grid of the SSB.

According to these embodiments, when it is determined that the SCS of the SSB is less than the SCS of the CORESET for the RMSI and the time-frequency multiplexing indication information indicates TDM of the CORESET for the RMSI and the SSB, the offset value between the PRB grid of the CORESET for the RMSI and the PRB grid of the SSB is acquired from the time-frequency multiplexing indication information, and the CORESET for the RMSI is searched in the corresponding frequency domain according to the offset value between the PRB grid of the CORESET for the RMSI and the PRB grid of the SSB, namely the UE may search the CORESET for the RMSI without any additional bits overhead.

Figure 11A:
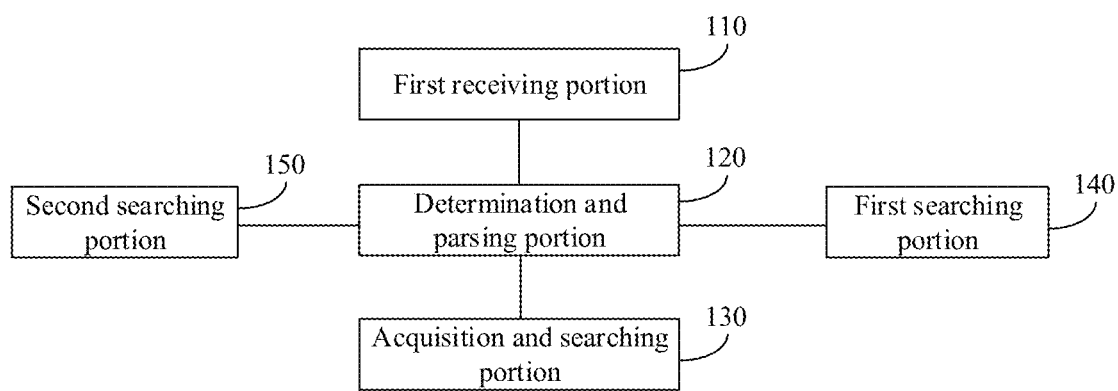
FIG. 11A is a block diagram of another device for searching a CORESET for RMSI, according to some embodiments of the present disclosure.

FIG. 11A is a block diagram of another device for searching a CORESET for RMSI, according to some embodiments of the present disclosure. As shown in FIG. 11A, based on the embodiment shown in FIG. 10, the device may further include a first searching portion 140 or a second searching portion 150.

The first searching portion 140 is configured to, responsive to that the SCS, determined by the determination and parsing portion 120, of the SSB is greater than or equal to the SCS of the CORESET for the RMSI and the time-frequency multiplexing indication information indicates TDM of the CORESET for the RMSI and the SSB, search the CORESET for the RMSI in a corresponding frequency domain and in a corresponding time domain.

Responsive to that the UE determines that the SCS of the SSB is greater than or equal to the SCS of the CORESET for the RMSI and the time-frequency multiplexing indication information indicates TDM of the CORESET for the RMSI and the SSB, the UE searches the CORESET for the RMSI in the corresponding frequency domain and in the corresponding time domain according to a TDM manner.

The second searching portion 150 is configured to, responsive to that the time-frequency multiplexing indication information determined by the determination and parsing portion 120 indicates FDM of the CORESET for the RMSI and the SSB, search the CORESET for the RMSI in a frequency domain which is lower than or higher than a predetermined frequency domain corresponding to the received SSB and in a corresponding time domain.

The UE, if knowing that the time-frequency multiplexing indication information indicates FDM of the CORESET for the RMSI and the SSB, may search the CORESET for the RMSI in a frequency domain adjacent to a frequency domain where the SSB is located and in a corresponding time domain, namely searching the CORESET for the RMSI in the frequency domain which is lower than or higher than the predetermined frequency domain corresponding to the received SSB and in a corresponding time domain.

According to these embodiments, the CORESET for the RMSI is searched according to obtained information, and an implementation manner is simple.

Figure 11B:
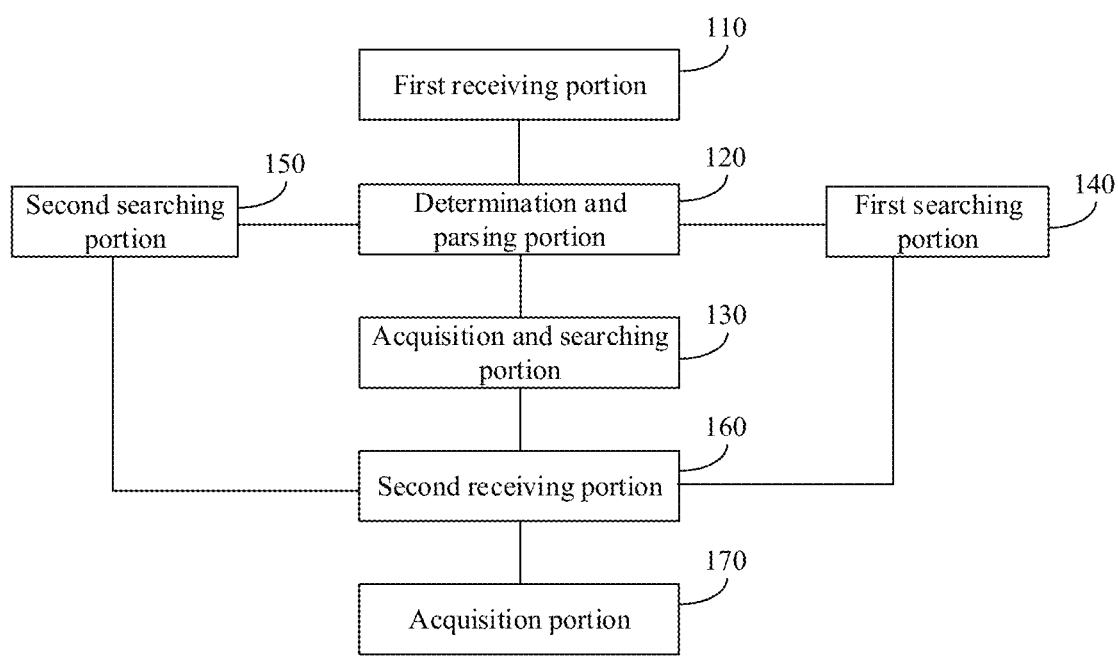
FIG. 11B is a block diagram of another device for searching a CORESET for RMSI, according to some embodiments of the present disclosure.

FIG. 11B is a block diagram of another device for searching a CORESET for RMSI, according to some embodiments. As shown in FIG. 11B, based on the embodiment shown in FIG. 10 or FIG. 11A, the device may further include a second receiving portion 160 and an acquisition portion 170.

The second receiving portion 160 is configured to, after the acquisition and searching portion 130, the first searching portion 140 or the second searching portion 150 searches the CORESET for the RMSI, receive an offset value, sent by the base station via signaling, between a PRB grid of other channel and the PRB grid of the SSB.

The acquisition portion 170 is configured to acquire information of the other channel according to the offset value, received by the second receiving portion 160, between a PRB grid of another channel or other channels and the PRB grid of the SSB.

According to these embodiments, after the CORESET for the RMSI is searched, the information of the other channel may be acquired according to the received offset value between a PRB grid of another channel or other channels and the PRB grid of the SSB, and an implementation manner is simple.

Figure 11C:
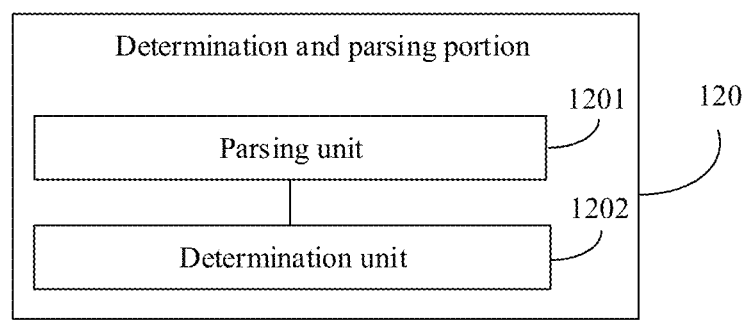
FIG. 11C is a block diagram of another device for searching a CORESET for RMSI, according to some embodiments of the present disclosure.

FIG. 11C is a block diagram of another device for searching a CORESET for RMSI, according to some embodiments of the present disclosure. As shown in FIG. 11C, based on the embodiment shown in FIG. 10, the determination and parsing portion 120 may include a parsing unit 1201 and a determination unit 1202.

The parsing unit 1201 is configured to try to parse a synchronization signal by using two predetermined SCSs of a frequency band where the SSB is located.

The determination unit 1202 is configured to determine the SCS through which the parsing unit 1201 correctly parses the synchronization signal as the SCS of the SSB.

According to these embodiments, the synchronization signal is tried to be parsed by using the two predetermined SCSs of the frequency band where the SSB is located, and the SCS through which the synchronization signal is correctly parsed is determined as the SCS of the SSB. An implementation manner is simple, and a condition is provided for subsequently comparing the SCS of the SSB and the SCS of the CORESET for the RMSI.

Figure 12:
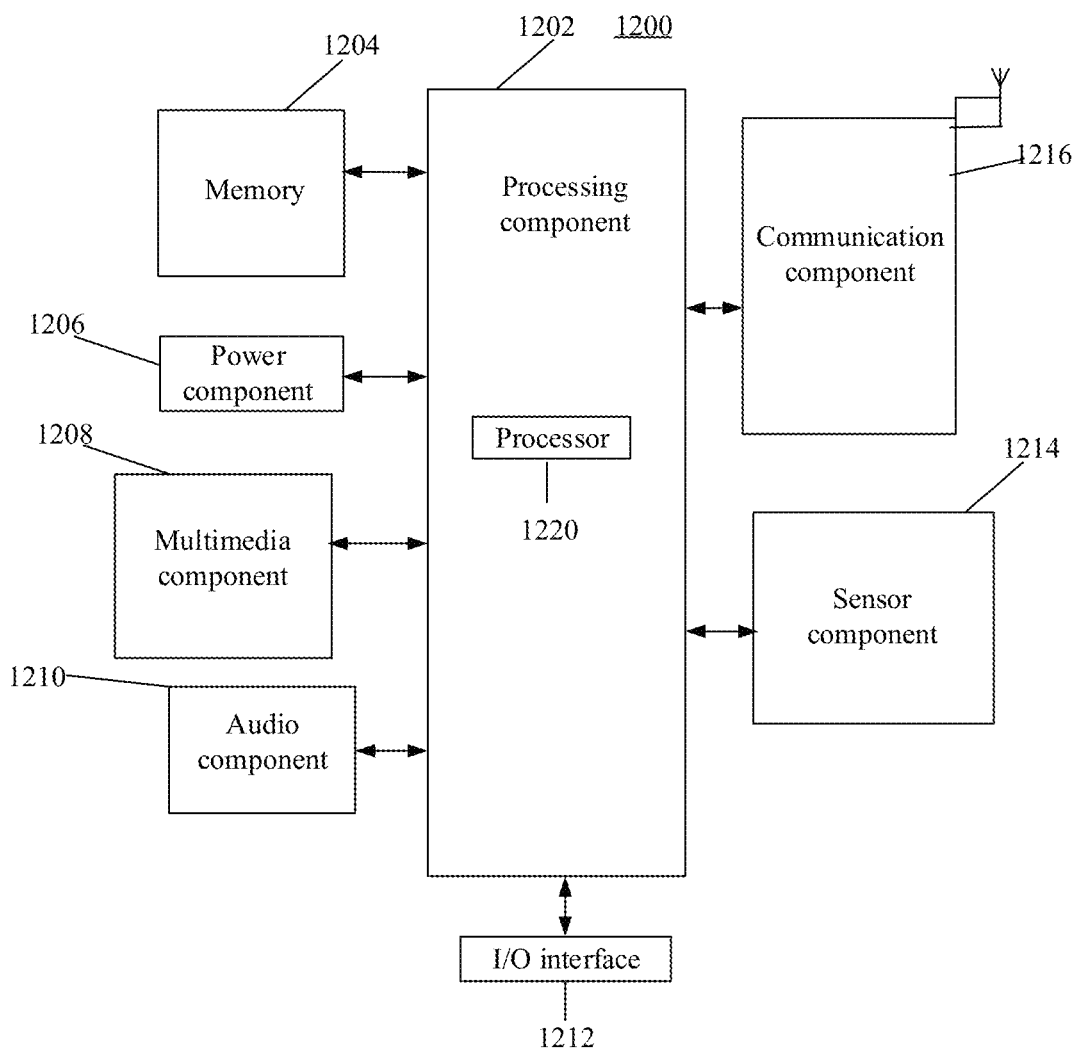
FIG. 12 is a block diagram of a device for searching a CORESET for RMSI, according to some embodiments of the present disclosure.

FIG. 12 is a block diagram of a device for searching a CORESET for RMSI, according to some embodiments of the present disclosure. For example, the device 1200 may be UE such as a mobile phone, a computer, a digital broadcast terminal, a messaging device, a gaming console, a tablet, a medical device, exercise equipment and a personal digital assistant.

Referring to FIG. 12, the device 1200 may include one or more of the following components: a processing component 1202, a memory 1204, a power component 1206, a multimedia component 1208, an audio component 1210, an Input/Output (I/O) interface 1212, a sensor component 1214, and a communication component 1216.

The processing component 1202 typically controls overall operations of the device 1200, such as the operations associated with display, telephone calls, data communications, camera operations, and recording operations. The processing component 1202 may include one or more processors 1220 to execute instructions to perform all or part of the steps in the abovementioned method. Moreover, the processing component 1202 may include one or more modules which facilitate interaction between the processing component 1202 and the other components. For instance, the processing component 1202 may include a multimedia module to facilitate interaction between the multimedia component 1208 and the processing component 1202.

One processor 1220 in the processing component 1202 may be configured to:

receive an SSB carrying time-frequency multiplexing indication information of a CORESET for RMSI from a base station, the time-frequency multiplexing indication information being in a PBCH of the SSB;

determine an SCS of the SSB and parse the PBCH of the SSB to obtain an SCS and the time-frequency multiplexing indication information of the CORESET for the RMSI; and responsive to that the SCS of the SSB is less than the SCS of the CORESET for the RMSI and the time-frequency multiplexing indication information indicates TDM of the CORESET for the RMSI and the SSB, acquire an offset value between the PRB grid of the CORESET for the RMSI and the PRB grid of the SSB from the time-frequency multiplexing indication information, and search the CORESET for the RMSI in a corresponding frequency domain according to the offset value between the PRB grid of the CORESET for the RMSI and the PRB grid of the SSB.

The memory 1204 is configured to store various types of data to support the operation of the device 1200. Examples of such data include instructions for any disclosures or methods operated on the device 1200, contact data, phonebook data, messages, pictures, video, etc. The memory 1204 may be implemented by any type of volatile or non-volatile memory devices, or a combination thereof, such as an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1206 provides power for various components of the device 1200. The power component 1206 may include a power management system, one or more power supplies, and other components associated with generation, management and distribution of power for the device 1200.

The multimedia component 1208 includes a screen providing an output interface between the device 1200 and a user. In some embodiments, the screen may include a Liquid Crystal Display (LCD) and a Touch Panel (TP). In some embodiments, organic light-emitting diode (OLED) or other types of displays can be employed. If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1208 includes a front camera and/or a rear camera. The front camera and/or the rear camera may receive external multimedia data when the device 1200 is in an operation mode, such as a photographing mode or a video mode. Each of the front camera and the rear camera may be a fixed optical lens system or have focusing and optical zooming capabilities.

The audio component 1210 is configured to output and/or input an audio signal. For example, the audio component 1210 includes a Microphone (MIC), and the MIC is configured to receive an external audio signal when the device 1200 is in the operation mode, such as a call mode, a recording mode and a voice recognition mode. The received audio signal may further be stored in the memory 1204 or sent through the communication component 1216. In some embodiments, the audio component 1210 further includes a speaker configured to output the audio signal.

The I/O interface 1212 provides an interface between the processing component 1202 and a peripheral interface module, and the peripheral interface module may be a keyboard, a click wheel, a button and the like. The button may include, but not limited to: a home button, a volume button, a starting button and a locking button.

The sensor component 1214 includes one or more sensors configured to provide status assessment in various aspects for the device 1200. For instance, the sensor component 1214 may detect an on/off status of the device 1200 and relative positioning of components, such as a display and small keyboard of the device 1200, and the sensor component 1214 may further detect a change in a position of the device 1200 or a component of the device 1200, presence or absence of contact between the user and the device 1200, orientation or acceleration/deceleration of the device 1200 and a change in temperature of the device 1200. The sensor component 1214 may include a proximity sensor configured to detect presence of an object nearby without any physical contact. The sensor component 1214 may also include a light sensor, such as a Complementary Metal Oxide Semiconductor (CMOS) or Charge Coupled Device (CCD) image sensor, configured for use in an imaging disclosure. In some embodiments, the sensor component 1214 may also include an acceleration sensor, a gyroscope sensor, a magnetic sensor, a pressure sensor or a temperature sensor.

The communication component 1216 is configured to facilitate wired or wireless communication between the device 1200 and another device. The device 1200 may access a communication-standard-based wireless network, such as a Wireless Fidelity (Wi-Fi) network, a 2nd-Generation (2G) or 3rd-Generation (3G), $4^{th}$-Generation (4G), or $5^{th}$-Generation (5G) network or a combination thereof. In some embodiments, the communication component 1216 receives a broadcast signal or broadcast associated information from an external broadcast management system through a broadcast channel. In some embodiments, the communication component 1216 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In some embodiments, the device 1200 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments, there is also provided a non-transitory computer-readable storage medium including an instruction, such as the memory 1204 including an instruction, and the instruction may be executed by the processor 1220 of the device 1200 to implement the abovementioned method. For example, the non-transitory computer-readable storage medium may be a ROM, a Compact Disc Read-Only Memory (CD-ROM), a magnetic tape, a floppy disc, an optical data storage device and the like.

Figure 13:
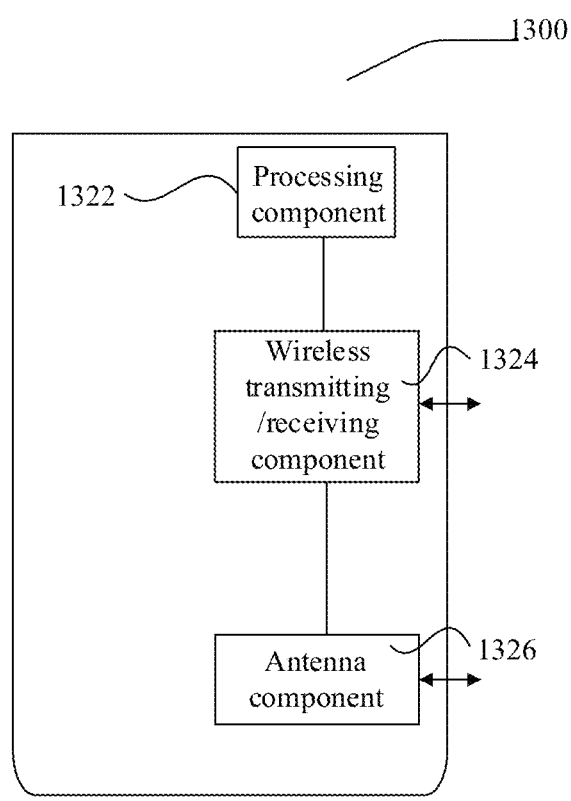
FIG. 13 is a block diagram of a device for information indication, according to some embodiments of the present disclosure.

FIG. 13 is a block diagram of a device for information indication, according to some embodiments of the present disclosure. The device 1300 may be provided as a base station. Referring to FIG. 13, the device 1300 includes a processing component 1322, a wireless transmitting/receiving component 1324, an antenna component 1326 and a wireless interface-specific signal processing part, and the processing component 1322 may further include one or more processors.

One processor in the processing component 1322 may be configured to:

determine whether a configured SCS of an SSB is less than an SCS of a common CORESET for RMSI corresponding to the SSB and whether time-frequency multiplexing indication information, in a PBCH of the SSB, of the CORESET for the RMSI indicates TDM of the CORESET for the RMSI and the SSB;

responsive to that the SCS of the SSB is less than the SCS of the CORESET for the RMSI and the time-frequency multiplexing indication information indicates TDM of the CORESET for the RMSI and the SSB, indicate an offset value between the PRB grid of the CORESET for the RMSI and the PRB grid of the SSB through the time-frequency multiplexing indication information; and send the SSB carrying the time-frequency multiplexing indication information to UE in a beam scanning manner.

In some embodiments, there is also provided a non-transitory computer-readable storage medium including an instruction, and the instruction may be executed by the processing component 1322 of the device 1300 to implement the method for information indication. For example, the non-transitory computer-readable storage medium may be a ROM, a CD-ROM, a magnetic tape, a floppy disc, an optical data storage device and the like.

The device embodiments substantially correspond to the method embodiments, and thus related parts refer to part of descriptions of the method embodiments. The device embodiment described above is only schematic, units described as separate parts therein may or may not be physically separated, and parts displayed as units may or may not be physical units, and namely may be located in the same place or may also be distributed to multiple network units. Part or all of the portions therein may be selected according to a practical requirement to achieve the purpose of the solutions of the embodiments. Those of ordinary skill in the art may understand and implement without creative work.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for searching a Common Control Resource Set (CORESET) for Remaining Minimum System Information (RMSI), applied to User Equipment (UE) and comprising:
   receiving a Synchronization Signal Block (SSB) carrying time-frequency multiplexing indication information of a CORESET for the RMSI from a base station, the time-frequency multiplexing indication information being in a Physical Broadcast Channel (PBCH) of the SSB;
   determining a Subcarrier Spacing (SCS) of the SSB, and parsing the PBCH of the SSB to obtain an SCS of the CORESET for the RMSI and the time-frequency multiplexing indication information of the CORESET for the RMSI; wherein the time-frequency multiplexing indication information comprises first time-frequency multiplexing indication information and second time-frequency multiplexing indication information, which indicate Time Division Multiplexing (TDM) of the CORESET for the RMSI and the SSB; and wherein the first time-frequency multiplexing indication information indicates a condition corresponding to an index, the condition corresponding to the index is that a starting position of Physical Resource Blocks (PRBs) of the SSB corresponds to a central position of one PRB of the CORESET for the RMSI; and the second time-frequency multiplexing indication information indicates another condition corresponding to another index, the other condition corresponding to the other index is that the starting position of the PRBs of the SSB corresponds to a starting position of one PRB of the CORESET for the RMSI; and
   responsive to that the SCS of the SSB is less than the SCS of the CORESET for the RMSI, and the time-frequency multiplexing indication information indicates the TDM of the CORESET for the RMSI and the SSB, acquiring an offset value between a PRB grid of the CORESET for the RMSI and a PRB grid of the SSB from the time-frequency multiplexing indication information, and searching the CORESET for the RMSI in a corresponding frequency domain according to the offset value between the PRB grid of the CORESET for the RMSI and the PRB grid of the SSB;
   wherein the determining the SCS of the SSB comprises:
   trying to parse a synchronization signal by using two predetermined SCSs of a frequency band where the SSB is located; and
   determining the SCS through which the synchronization signal is correctly parsed as the SCS of the SSB.

2. The method of claim 1, further comprising:
   responsive to that the SCS of the SSB is greater than or equal to the SCS of the CORESET for the RMSI, and the time-frequency multiplexing indication information indicates TDM of the CORESET for the RMSI and the SSB, searching the CORESET for the RMSI in a corresponding frequency domain and a corresponding time domain; or
   responsive to that the time-frequency multiplexing indication information indicates Frequency Division Multiplexing (FDM) of the CORESET for the RMSI and the SSB, searching the CORESET for the RMSI in a frequency domain which is lower than or higher than a predetermined frequency domain corresponding to the received SSB and in a corresponding time domain.

3. The method of claim 2, further comprising:
   after searching the CORESET for the RMSI, receiving an offset value between a PRB grid of another channel and the PRB grid of the SSB, the offset value between the PRB grid of the other channel and the PRB grid of the SSB being sent by the base station through signaling; and
   acquiring information of the other channel according to the offset value between the PRB grid of the other channel and the PRB grid of the SSB.

4. The method of claim 1, further comprising:
   after searching the CORESET for the RMSI, receiving an offset value between a PRB grid of another channel and the PRB grid of the SSB, the offset value between the PRB grid of the other channel and the PRB grid of the SSB being sent by the base station through signaling; and acquiring information of the other channel according to the offset value between the PRB grid of the other channel and the PRB grid of the SSB.

5. A device for searching a Common Control Resource Set (CORESET) for Remaining Minimum System Information (RMSI), applied to User Equipment (UE) and comprising:
a processor; and
a memory device configured to store processor-executable instructions,
wherein the processor is configured to:
receive a Synchronization Signal Block (SSB) carrying time-frequency multiplexing indication information of a CORESET for the RMSI from a base station, the time-frequency multiplexing indication information being in a Physical Broadcast Channel (PBCH) of the SSB;
determine a Subcarrier Spacing (SCS) of the SSB, and parse the PBCH of the SSB to obtain an SCS of the CORESET for the RMSI and the time-frequency multiplexing indication information of the CORESET for the RMSI; wherein the time-frequency multiplexing indication information comprises first time-frequency multiplexing indication information and second time-frequency multiplexing indication information, which indicate Time Division Multiplexing (TDM) of the CORESET for the RMSI and the SSB; and wherein the first time-frequency multiplexing indication information indicates a condition corresponding to an index, the condition corresponding to the index is that a starting position of Physical Resource Blocks (PRBs) of the SSB corresponds to a central position of one PRB of the CORESET for the RMSI; and the second time-frequency multiplexing indication information indicates another condition corresponding to another index, the other condition corresponding to the other index is that the starting position of the PRBs of the SSB corresponds to a starting position of one PRB of the CORESET for the RMSI; and
responsive to that the SCS of the SSB is less than the SCS of the CORESET for the RMSI and the time-frequency multiplexing indication information indicates the TDM of the CORESET for the RMSI and the SSB, acquire an offset value between a PRB grid of the CORESET for the RMSI and a PRB grid of the SSB from the time-frequency multiplexing indication information and search the CORESET for the RMSI in a corresponding frequency domain according to the offset value between the PRB grid of the CORESET for the RMSI and the PRB grid of the SSB;
wherein the processor is further configured to:
try to parse a synchronization signal by using two predetermined SCSs of a frequency band where the SSB is located; and
determine the SCS through which the processor correctly parses the synchronization signal as the SCS of the SSB.

6. The device of claim 5, wherein the processor is further configured to:
responsive to that the SCS of the SSB is greater than or equal to the SCS of the CORESET for the RMSI and the time-frequency multiplexing indication information indicates TDM of the CORESET for the RMSI and the SSB, search the CORESET for the RMSI in a corresponding frequency domain and a corresponding time domain; or
responsive to that the time-frequency multiplexing indication information indicates Frequency Division Multiplexing (FDM) of the CORESET for the RMSI and the SSB, search the CORESET for the RMSI in a frequency domain which is lower than or higher than a predetermined frequency domain corresponding to the received SSB and in corresponding time domain.

7. The device of claim 6, wherein the processor is further configured to:
after the CORESET for the RMSI is searched, receive an offset value between a PRB grid of another channel and the PRB grid of the SSB, the offset value between the PRB grid of the other channel and the PRB grid of the SSB being sent by the base station through signaling; and
acquire information of the other channel according to the offset value between the PRB grid of the other channel and the PRB grid of the SSB.

8. The device of claim 5, wherein the processor is further configured to:
after the CORESET for the RMSI is searched, receive an offset value between a PRB grid of another channel and the PRB grid of the SSB, the offset value between the PRB grid of the other channel and the PRB grid of the SSB being sent by the base station through signaling; and
acquire information of the other channel according to the offset value between the PRB grid of the other channel and the PRB grid of the SSB.

9. A non-transitory computer-readable medium having instructions stored thereon for execution by a processing circuit of User Equipment (UE) to enable the UE to execute a method for searching a Common Control Resource Set (CORESET) for Remaining Minimum System Information (RMSI), the method comprising:
receiving a Synchronization Signal Block (SSB) carrying time-frequency multiplexing indication information of a CORESET for the RMSI from a base station, the time-frequency multiplexing indication information being in a Physical Broadcast Channel (PBCH) of the SSB;
determining a Subcarrier Spacing (SCS) of the SSB, and parsing the PBCH of the SSB to obtain an SCS of the CORESET for the RMSI and the time-frequency multiplexing indication information of the CORESET for the RMSI; wherein the time-frequency multiplexing indication information comprises first time-frequency multiplexing indication information and second time-frequency multiplexing indication information, which indicate Time Division Multiplexing (TDM) of the CORESET for the RMSI and the SSB; and wherein the first time-frequency multiplexing indication information indicates a condition corresponding to an index, the condition corresponding to the index is that a starting position of Physical Resource Blocks (PRBs) of the SSB corresponds to a central position of one PRB of the CORESET for the RMSI; and the second time-frequency multiplexing indication information indicates another condition corresponding to another index, the other condition corresponding to the other index is that the starting position of the PRBs of the SSB corresponds to a starting position of one PRB of the CORESET for the RMSI; and
responsive to that the SCS of the SSB is less than the SCS of the CORESET for the RMSI, and the time-frequency multiplexing indication information indicates the TDM of the CORESET for the RMSI and the SSB, acquiring an offset value between a PRB grid of the CORESET for the RMSI and a PRB grid of the SSB from the time-frequency multiplexing indication information, and searching the CORESET for the RMSI in a corresponding frequency domain according to the offset value between the PRB grid of the CORESET for the RMSI and the PRB grid of the SSB;

wherein the determining the SCS of the SSB comprises:
trying to parse a synchronization signal by using two predetermined SCSs of a frequency band where the SSB is located; and
determining the SCS through which the synchronization signal is correctly parsed as the SCS of the SSB.

10. The non-transitory computer-readable medium of claim 9, wherein the method further comprises:
responsive to that the SCS of the SSB is greater than or equal to the SCS of the CORESET for the RMSI, and the time-frequency multiplexing indication information indicates TDM of the CORESET for the RMSI and the SSB, searching the CORESET for the RMSI in a corresponding frequency domain and a corresponding time domain; or
responsive to that the time-frequency multiplexing indication information indicates Frequency Division Multiplexing (FDM) of the CORESET for the RMSI and the SSB, searching the CORESET for the RMSI in a frequency domain which is lower than or higher than a predetermined frequency domain corresponding to the received SSB and in a corresponding time domain.

11. The non-transitory computer-readable medium of claim 10, wherein the method further comprises:
after searching the CORESET for the RMSI, receiving an offset value between a PRB grid of another channel and the PRB grid of the SSB, the offset value between the PRB grid of the other channel and the PRB grid of the SSB being sent by the base station through signaling; and
acquiring information of the other channel according to the offset value between the PRB grid of the other channel and the PRB grid of the SSB.

12. The non-transitory computer-readable medium of claim 9, wherein the method further comprises:
after searching the CORESET for the RMSI, receiving an offset value between a PRB grid of another channel and the PRB grid of the SSB, the offset value between the PRB grid of the other channel and the PRB grid of the SSB being sent by the base station through signaling; and
acquiring information of the other channel according to the offset value between the PRB grid of the other channel and the PRB grid of the SSB.

* * * * *